(12) United States Patent
Song et al.

(10) Patent No.: US 12,045,975 B2
(45) Date of Patent: Jul. 23, 2024

(54) MASK INSPECTION APPARATUS AND MASK INSPECTION METHOD USING THE SAME

(71) Applicant: Samsung Display Co., Ltd., Yongin-si (KR)

(72) Inventors: Ilha Song, Asan-si (KR); Mihye Kwon, Asan-si (KR); Jimin Woo, Asan-si (KR); Sangdon Hwang, Cheonan-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 416 days.

(21) Appl. No.: 17/362,123

(22) Filed: Jun. 29, 2021

(65) Prior Publication Data

US 2022/0114714 A1 Apr. 14, 2022

(30) Foreign Application Priority Data

Oct. 8, 2020 (KR) .................. 10-2020-0130511

(51) Int. Cl.
 *G06T 7/00* (2017.01)
 *G01N 21/956* (2006.01)
 *G06T 7/11* (2017.01)

(52) U.S. Cl.
 CPC ....... *G06T 7/001* (2013.01); *G01N 21/95607* (2013.01); *G06T 7/11* (2017.01); *G01N 2021/95615* (2013.01); *G01N 2021/95676* (2013.01); *G06T 2207/30148* (2013.01)

(58) Field of Classification Search
 CPC ... C23C 14/048; C23C 16/042; B23K 26/066; B23K 26/03; G03F 1/84; G01N 21/95607; G01N 2021/95676; G01N 2021/95615; G06T 7/12; G06T 7/11; G06T 7/162; G06T 7/13; G06T 7/001; G06T 5/009; G06T 2207/30148
 USPC .................. 356/237.1–237.5; 382/141–154
 See application file for complete search history.

(56) References Cited

U.S. PATENT DOCUMENTS

| | | | |
|---|---|---|---|
| 2005/0244049 A1* | 11/2005 | Onishi | H01J 37/29 382/141 |
| 2014/0306109 A1* | 10/2014 | Sun | H01J 37/26 250/307 |
| 2016/0161555 A1* | 6/2016 | Wei | G01N 21/95 356/239.1 |
| 2020/0096861 A1 | 3/2020 | Moon et al. | |
| 2020/0131618 A1 | 4/2020 | Moon et al. | |

FOREIGN PATENT DOCUMENTS

| | | |
|---|---|---|
| JP | 6323266 | 5/2018 |
| KR | 10-1053779 | 8/2011 |
| KR | 10-2020-0034080 | 3/2020 |
| KR | 10-2020-0047838 | 5/2020 |

* cited by examiner

*Primary Examiner* — Hoa Q Pham
(74) *Attorney, Agent, or Firm* — KILE PARK REED & HOUTTEMAN PLLC

(57) ABSTRACT

A mask inspection method includes photographing a cell mask through which openings is formed to obtain an image, setting an area of the image adjacent to an edge of the cell mask as an inspection area, comparing a grayscale of the openings in the inspection area with a reference grayscale, and checking a defect of the cell mask according to a result of the comparing of the grayscale of the openings.

23 Claims, 13 Drawing Sheets

MASK INSPECTION APPARATUS AND MASK INSPECTION METHOD USING THE SAME

CROSS-REFERENCE TO RELATED APPLICATION(S)

This U.S. non-provisional patent application claims priority to and the benefit of Korean Patent Application No. 10-2020-0130511 under 35 U.S.C. § 119, filed in the Korean Intellectual Property Office (KIPO) on Oct. 8, 2020, the entire contents of which are incorporated herein by reference.

BACKGROUND

1. Technical Field

The disclosure relates to a mask inspection apparatus capable of inspecting a mask through which different openings are defined and a mask inspection method using the same.

2. Description of Related Art

Recently, an organic light emitting diode display (OLED) is being spotlighted as a next generation display device for its superior brightness and viewing angle. Since the organic light emitting diode display does not need to include a separate light source when compared to a liquid crystal display, it is provided with thin thickness and light weight. In addition, the organic light emitting diode display has properties, such as fast response speed, low power consumption, high brightness, etc.

The organic light emitting diode display includes light emitting elements that includes an anode, a light emitting layer, and a cathode. Holes and electrons are injected into the light emitting layer through the anode and the cathode and are recombined in the light emitting layer to generate excitons. The excitons emit energy, which is discharged when an excited state returns to a ground state, as light. When the light emitting element is manufactured, a mask is disposed above a substrate, and an organic material used to form the light emitting layer is provided on the substrate through openings defined through the mask.

SUMMARY

The disclosure provides a mask inspection apparatus capable of inspecting a mask through which openings is defined.

The disclosure provides a mask inspection method using the mask inspection apparatus.

Embodiments of the disclosure provide a mask inspection method including photographing a cell mask through which a plurality of openings is formed to obtain an image, setting an area of the image adjacent to an edge of the cell mask as an inspection area, comparing a grayscale of the plurality of openings in the inspection area with a reference grayscale, and checking a defect of the cell mask according to a result of the comparing of the grayscale of the plurality of openings.

The reference grayscale may be in a range of about 20 to about 80.

The checking of the defect of the cell mask may include determining that the cell mask is a defective cell mask in case that the grayscale of the plurality of openings is less than the reference grayscale.

The checking of the defect of the cell mask may include determining that the cell mask is a normal cell mask in case that the grayscale of the plurality of openings is equal to or greater than the reference grayscale.

The cell mask may include first sides extending in a first direction and disposed at ends of the cell mask in a second direction intersecting the first direction; and second sides extending in the second direction and disposed at ends of the cell mask in the first direction. First sticks may be disposed under the second sides and extend in the second direction, and second sticks may be disposed under the first sides and extend in the first direction.

The setting of the inspection area may include setting areas of the cell mask adjacent to the first sides in the image as a first inspection area; and setting areas of the cell mask adjacent to the second sides in the image as a second inspection area.

The grayscale of the plurality of openings of the second inspection area may be less than the reference grayscale in case that the plurality of openings of the second inspection area overlap the first sticks.

The grayscale of the plurality of openings of the second inspection area may be equal to or greater than the reference grayscale in case that the plurality of openings of the second inspection area do not overlap the first sticks.

The grayscale of the plurality of openings of the first inspection area may be less than the reference grayscale in case that the plurality of openings of the first inspection area overlap the second sticks.

The grayscale of the plurality of openings of the first inspection area may be equal to or greater than the reference grayscale in case that the plurality of openings of the first inspection area do not overlap the second sticks.

The mask inspection method may further include irradiating light to the cell mask from under the cell mask.

The grayscale of the plurality of openings in the image may be determined based on the light.

Embodiments of the disclosure provide a mask inspection apparatus including a camera photographing a cell mask through which a plurality of openings is formed to obtain an image, a light source disposed under the cell mask to provide light to the cell mask, and a controller checking a defect of the cell mask using the image. The controller may set an area of the image adjacent to an edge of the cell mask as an inspection area, compare a grayscale of the plurality of openings in the inspection area with a reference grayscale, and check a defect of the cell mask according to a result of the comparing of the grayscale of the plurality of openings.

The controller may determine that the cell mask is a defective cell mask in case that the grayscale of the plurality of openings is less than the reference grayscale and determine that the cell mask is a normal cell mask in case that the grayscale of the plurality of openings is equal to or greater than the reference grayscale.

The cell mask may include first sides extending in a first direction and disposed at ends of the cell mask in a second direction intersecting the first direction; and second sides extending in the second direction and disposed at ends of the cell mask in the first direction. First sticks may be disposed under the second sides and extend in the second direction, and second sticks may be disposed under the first sides and extend in the first direction.

The inspection area may include a first inspection area set as areas of the cell mask adjacent to the first sides in the image; and a second inspection area set as areas of the cell mask adjacent to the second sides in the image.

The reference grayscale may be in a range of about 20 to about 80.

The grayscale of the plurality of openings of the second inspection area may be less than the reference grayscale in case that the plurality of openings of the second inspection area overlap the first sticks, and the grayscale of the plurality of openings of the second inspection area may be equal to or greater than the reference grayscale in case that the plurality of openings of the second inspection area do not overlap the first sticks.

The grayscale of the plurality of openings of the first inspection area may be less than the reference grayscale in case that the plurality of openings of the first inspection area overlap the second sticks, and the grayscale of the plurality of openings of the first inspection area may be equal to or greater than the reference grayscale in case that the plurality of openings of the first inspection area do not overlap the second sticks.

The controller may include a memory in which data related to the reference grayscale is stored.

According to the above, it is possible to inspect whether or not the first sticks and the second sticks are bent and cover the openings of the masks before a deposition process, and thus, a defect rate in the deposition process is reduced.

BRIEF DESCRIPTION OF THE DRAWINGS

The above and other advantages of the disclosure will become readily apparent by reference to the following detailed description when considered in conjunction with the accompanying drawings wherein.

DETAILED DESCRIPTION OF THE EMBODIMENTS

Figure 1:
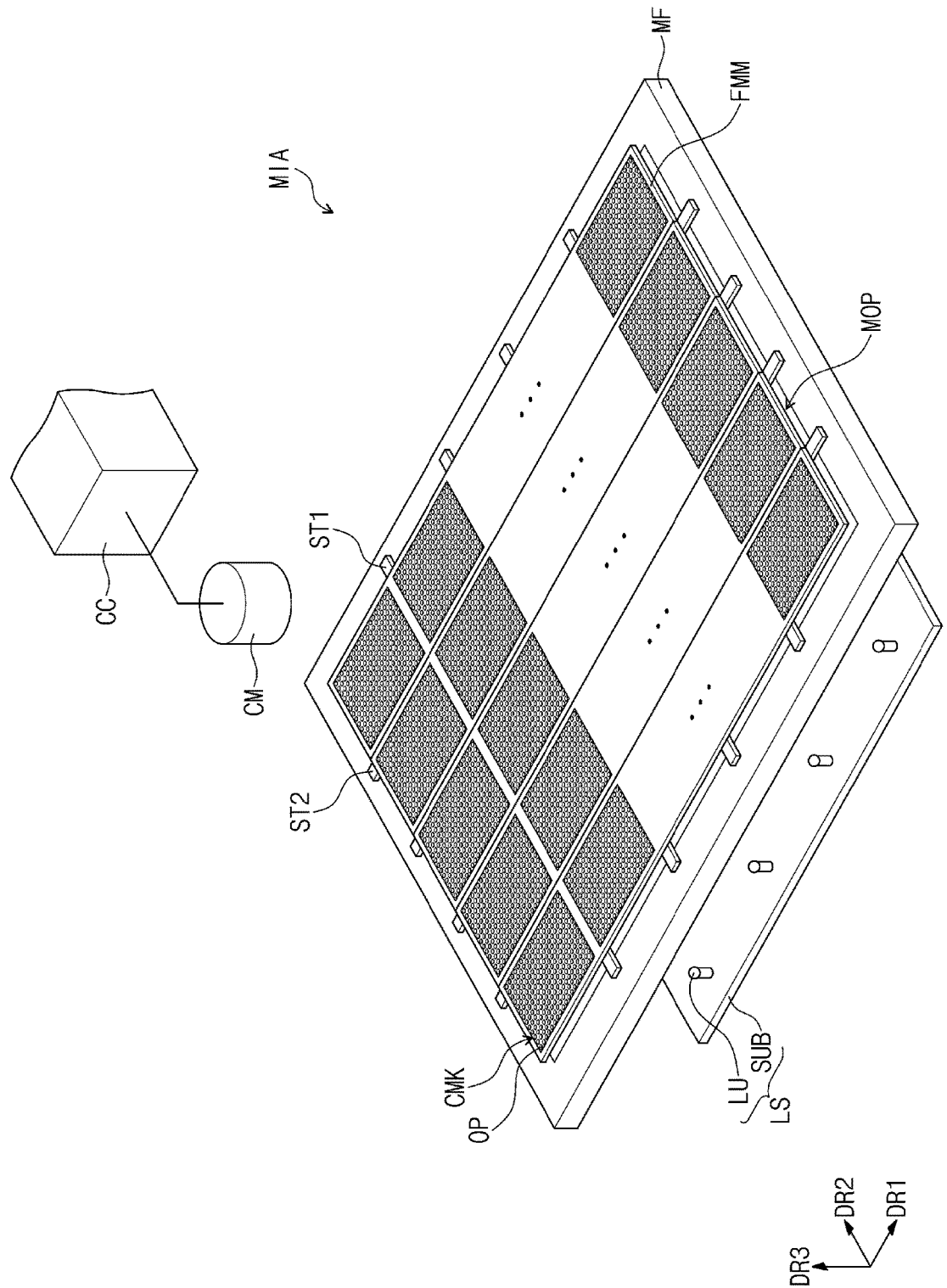
FIG. 1 is a perspective view schematically illustrating a mask inspection apparatus according to an embodiment of the disclosure.

In the disclosure, it will be understood that when an element or layer is referred to as being "on," "connected to" or "coupled to" another element or layer, it can be directly on, connected or coupled to the other element or layer or one or more intervening elements or layers may be present.

Like numerals refer to like elements throughout. In the drawings, the thickness, ratio, and dimension of components are exaggerated for effective description of the technical content.

As used herein, the term "and/or" includes any and all combinations of one or more of the associated listed items.

It will be understood that, although the terms first, second, and the like may be used herein to describe various elements, these elements should not be limited by these terms. These terms are only used to distinguish one element from another element. Thus, a first element discussed below could be termed a second element without departing from the teachings of the disclosure. As used herein, the singular forms, "a," "an," and "the" are intended to include the plural forms as well, unless the context clearly indicates otherwise.

Spatially relative terms, such as "beneath," "below," "lower," "above," "upper" and the like, may be used herein for ease of description to describe one element or feature's relationship to another element(s) or feature(s) as illustrated in the figures.

Unless otherwise defined or implied herein, all terms (including technical and scientific terms) used herein have the same meaning as commonly understood by one of ordinary skill in the art to which this disclosure pertains. It will be further understood that terms, such as those defined in commonly used dictionaries, should be interpreted as having a meaning that is consistent with their meaning in the context of the relevant art and the disclosure, and should not be interpreted in an ideal or excessively formal sense unless clearly so defined herein.

It will be further understood that the terms "includes," "comprises," and/or variations thereof such as "including," when used in this specification, specify the presence of stated features, integers, steps, operations, elements, and/or components, but do not preclude the presence or addition of one or more other features, integers, steps, operations, elements, components, and/or groups thereof.

Hereinafter, the disclosure will be explained in detail with reference to the accompanying drawings.

FIG. 1 is a perspective view schematically illustrating a mask inspection apparatus MIA according to an embodiment of the disclosure.

Referring to FIG. 1, the mask inspection apparatus MIA may inspect masks FMM disposed on a mask frame MF. First sticks ST1 and second sticks ST2 may be disposed on the mask frame MF. The masks FMM may be disposed on the first sticks ST1 and the second sticks ST2. The masks FMM may be supported by the first sticks ST1 and the second sticks ST2.

The mask frame MF may have a quadrangular frame shape through which a mask opening MOP is defined. However, this is merely an example, and the mask frame MF may have a variety of shapes. The mask frame MF may include a metal material. For example, the mask frame MF may include Invar, however, it is not limited thereto or thereby, and the mask frame MF may include various metal materials.

The first sticks ST1 may be arranged in a first direction DR1 and may extend in a second direction DR2 intersecting the first direction DR1. The first sticks ST1 may have a bar shape extending in the second direction DR2. However, this is merely an example, and the first sticks ST1 may have a variety of shapes. For the convenience of explanation, four first sticks ST1 are shown, however, the number of the first sticks ST1 are not limited to four. The first sticks ST1 will be described in detail with reference to FIG. 2.

The second sticks ST2 may extend in the first direction DR1 and may be arranged in the second direction DR2. The second sticks ST2 may have a bar shape extending in the first direction DR1. However, this is merely an example, and the second sticks ST2 may have a variety of shapes. For the convenience of explanation, four second sticks ST2 are shown, however, the number of the second sticks ST2 are not limited to four. The second sticks ST2 will be described in detail with reference to FIG. 2.

The first sticks ST1 and the second sticks ST2 may include a metal material. For example, the first sticks ST1 and the second sticks ST2 may include Invar, however, they are not limited thereto or thereby, and the first sticks ST1 and the second sticks ST2 may include various metal materials.

Hereinafter, a direction substantially perpendicular to a plane defined by the first and second directions DR1 and DR2 is referred to as a third direction DR3. In the disclosure, the expression "when viewed in a plane" or "in a plan view" may mean being viewed from above in the third direction DR3.

The masks FMM may extend in the first direction DR1 and may be arranged in the second direction DR2. The masks FMM may have a rectangular shape extending longer in the first direction DR1. However, this is merely an example, and the masks FMM may have a variety of shapes and are not particularly limited. The masks FMM may include a plane defined by the first direction DR1 and the second direction DR2. For the convenience of explanation, five masks FMM are shown, however, the number of masks FMM is not limited to five.

Cell masks CMK may be defined in each of the masks FMM. In each of the masks FMM, the cell masks CMK may be arranged in the first direction DR1. Each of the cell masks CMK may be provided with openings OP defined therethrough.

Each of the masks FMM may have a thickness smaller than a thickness of the mask frame MF in the third direction DR3.

The mask inspection apparatus MIA may include a camera CM, a controller CC, and a light source LS. The camera CM may be disposed above the masks FMM. The camera CM may take a photograph of the masks FMM. For example, the camera CM may take a photograph of an entire area of the masks FMM.

The controller CC may receive a photographed image of the masks FMM from the camera CM. The controller CC may inspect the image provided from the camera CM to determine whether the masks FMM are defective.

The controller CC may be electrically connected to the camera CM through a communication cable. However, this is merely an example, and the connection between the controller CC and the camera CM is not limited thereto or thereby. For example, the controller CC may receive the image from the camera CM via a wireless communication. The controller CC may be a computer that includes a communication interface and a processor to communicate with the camera CM, however, it is not limited thereto or thereby.

The light source LS may be disposed under the mask frame MF. The light source LS may be disposed under the masks FMM and may provide a light to the masks FMM. In a plan view, the light source LS may overlap the mask opening MOP defined through the mask frame MF.

The light source LS may include a substrate SUB and light source units LU. The substrate SUB may have a quadrangular shape defined by the first direction DR1 and the second direction DR2. The substrate SUB may be disposed under the masks FMM.

The light source units LU may be disposed on the substrate SUB. The light source units LU may be arranged in the first direction DR1 and the second direction DR2. The light source units LU may be arranged in the first direction DR1 and the second direction DR2 at regular intervals, however, the arrangement of the light source units LU is not limited thereto or thereby.

The light source units LU may be disposed under the cell masks CMK and may provide a light to the cell masks CMK.

Figure 2:
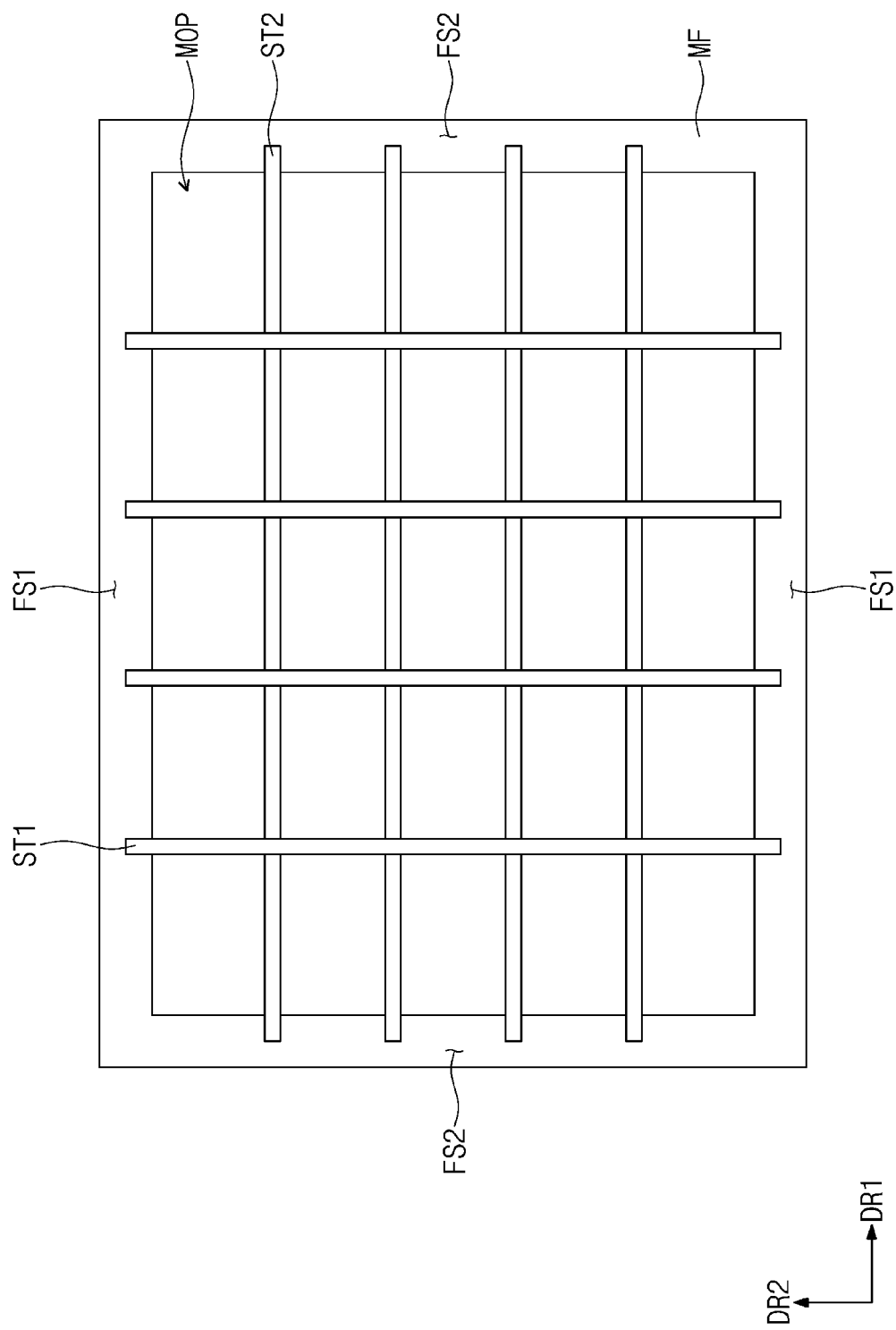
FIG. 2 is a plan view schematically illustrating an arrangement of a mask frame, first sticks, and second sticks shown in FIG. 1.

FIG. 2 is a plan view schematically illustrating an arrangement of the mask frame MF, the first sticks ST1, and the second sticks ST2 shown in FIG. 1.

Referring to FIG. 2, the mask opening MOP defined through the mask frame MF may be a hole with a quadrangular shape defined by the first direction DR1 and the second direction DR2.

Both ends of the first sticks ST1, which are opposite to each other in the second direction DR2, may be disposed on an upper surface of the mask frame MF adjacent to first frame sides FS1 of the mask frame MF, which are opposite to each other in the second direction DR2. The both ends of the first sticks ST1 may be attached by welding them to the upper surface of the mask frame MF. The first sticks ST1 may be disposed in the first direction DR1 to be spaced apart from each other at regular intervals.

Both ends of the second sticks ST2 may be disposed on the upper surface of the mask frame MF adjacent to second frame sides FS2 of the mask frame MF, which are opposite to each other in the first direction DR1. The both ends of the second sticks ST2 may be attached by welding them to the upper surface of the mask frame MF. The second sticks ST2 may be disposed in the second direction DR2 to be spaced apart from each other at regular intervals.

The first sticks ST1 may be disposed on the second sticks ST2, and the first sticks ST1 may intersect the second sticks ST2. The intersecting portions of the first sticks ST1 and the second sticks ST2 may be attached to each other by welding, however, they are not limited thereto or thereby. For example, the first sticks ST1 may intersect the second sticks ST2 without being attached to the second sticks ST2.

The cell masks CMK may respectively overlap areas defined the first sticks ST1 and the second sticks ST2 intersecting the first sticks ST1.

Figure 3:
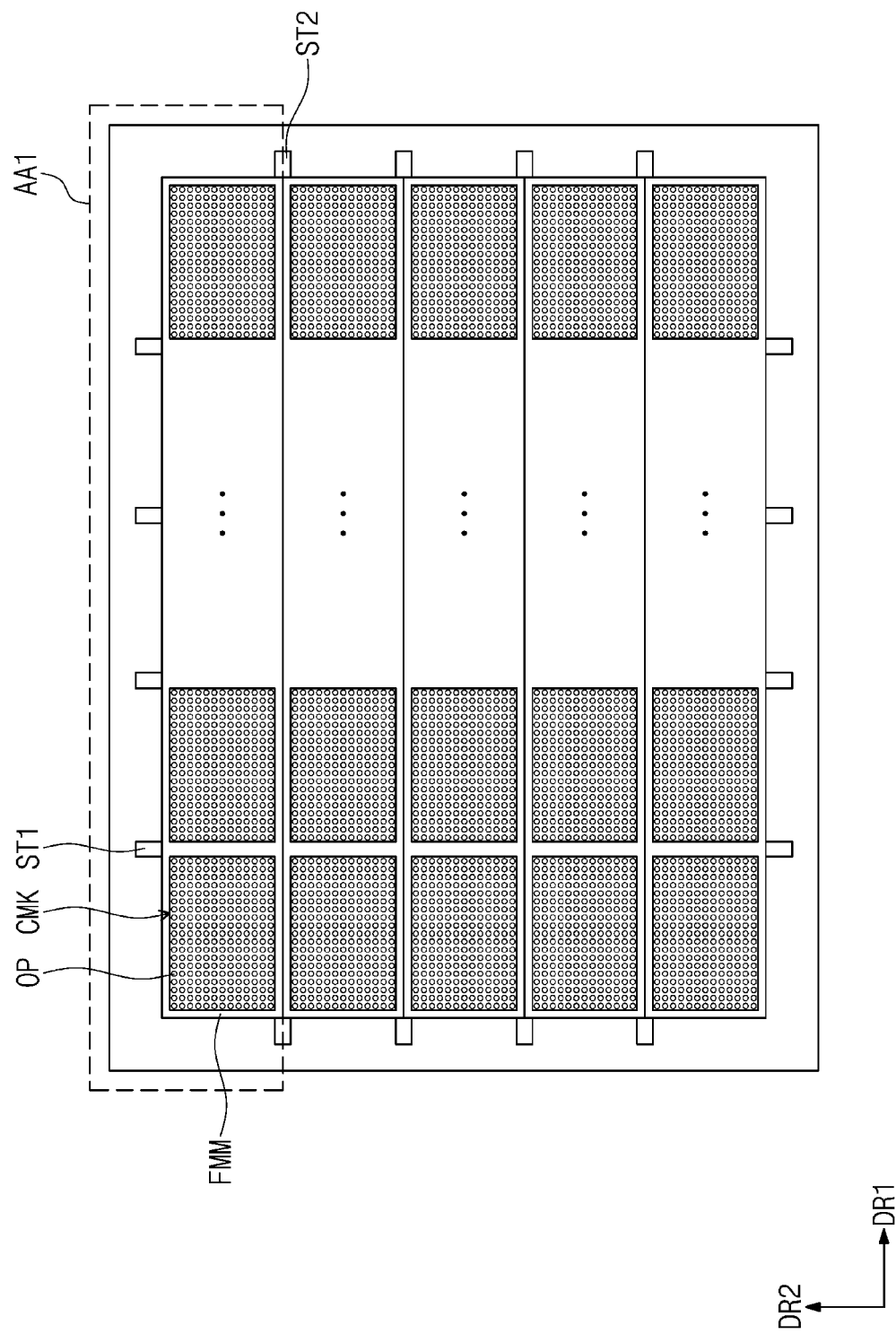
FIG. 3 is a plan view schematically illustrating masks disposed on the first sticks and the second sticks shown in FIG. 2.

FIG. 3 is a plan view showing the masks FMM disposed on the first sticks ST1 and the second sticks ST2 shown in FIG. 2.

Referring to FIG. 3, the masks FMM may be attached to the first sticks ST1, the second sticks ST2, and the mask frame MF by welding, however, they are not limited thereto or thereby. For example, the masks FMM may be attached to the mask frame MF by welding and may be disposed on the first sticks ST1 and the second sticks ST2 without being attached to the first sticks ST1 and the second sticks ST2.

The masks FMM may be manufactured using a thin plate. As a material for the masks FMM, stainless steel, Invar, nickel (NI), cobalt (Co), nickel alloy, nickel-cobalt alloy, or the like may be used, however, this is merely an example. The material for the masks FMM is not limited thereto or thereby, and various materials may be used as the material for the masks FMM.

The masks FMM may be arranged to be adjacent to each other in the second direction DR2. As an example, the masks FMM may contact each other in the second direction DR2, however, the masks FMM may be spaced apart from each other according to another embodiment.

The cell masks CMK defined in each of the masks FMM may have a rectangular shape defined by long sides extending in the first direction DR1 and short sides extending in the second direction DR2. The openings OP may be defined in the cell masks CMK. The cell masks CMK may be disposed to be adjacent to each other in the first direction DR1 on the first sticks ST1 and the second sticks ST2.

Figure 4:
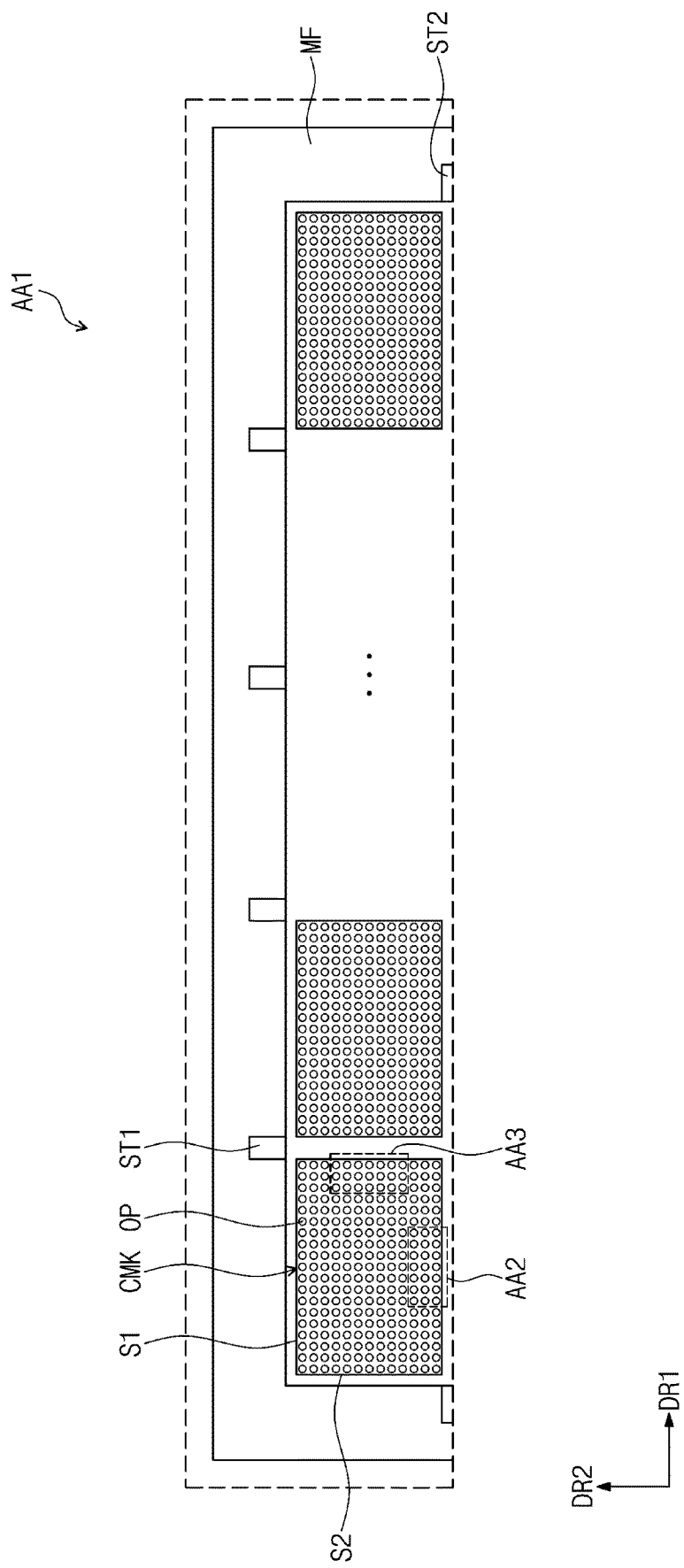
FIG. 4 is an enlarged view schematically illustrating a first area AA1 shown in FIG. 3.

FIG. 4 is an enlarged view schematically illustrating a first area AA1 shown in FIG. 3.

Referring to FIG. 4, the openings OP may be defined through the cell masks CMK. The number of the openings OP arranged in the first direction DR1 may be greater than the number of the openings OP arranged in the second direction DR2. The openings OP may be arranged in the first direction DR1 and the second direction DR2 and may be spaced apart from each other at regular intervals. The openings OP may not overlap the first stick ST1 and the second stick ST2.

The openings OP may be used as passages through which a deposition material passes. The openings OP may expose a deposition target area of the substrate. The openings OP may expose the deposition target area that is to be formed.

The cell mask CMK may include first sides S1 that extend in the first direction DR1 and are disposed at opposite ends thereof in the second direction DR2 and second sides S2 that extend in the second direction DR2 and are disposed at opposite ends thereof in the first direction DR1.

The first sticks ST1 may extend in the second direction DR2 and may be disposed under the second sides S2. The second sticks ST2 may extend in the first direction DR1 and may be disposed under the first sides S1.

Figure 5A:
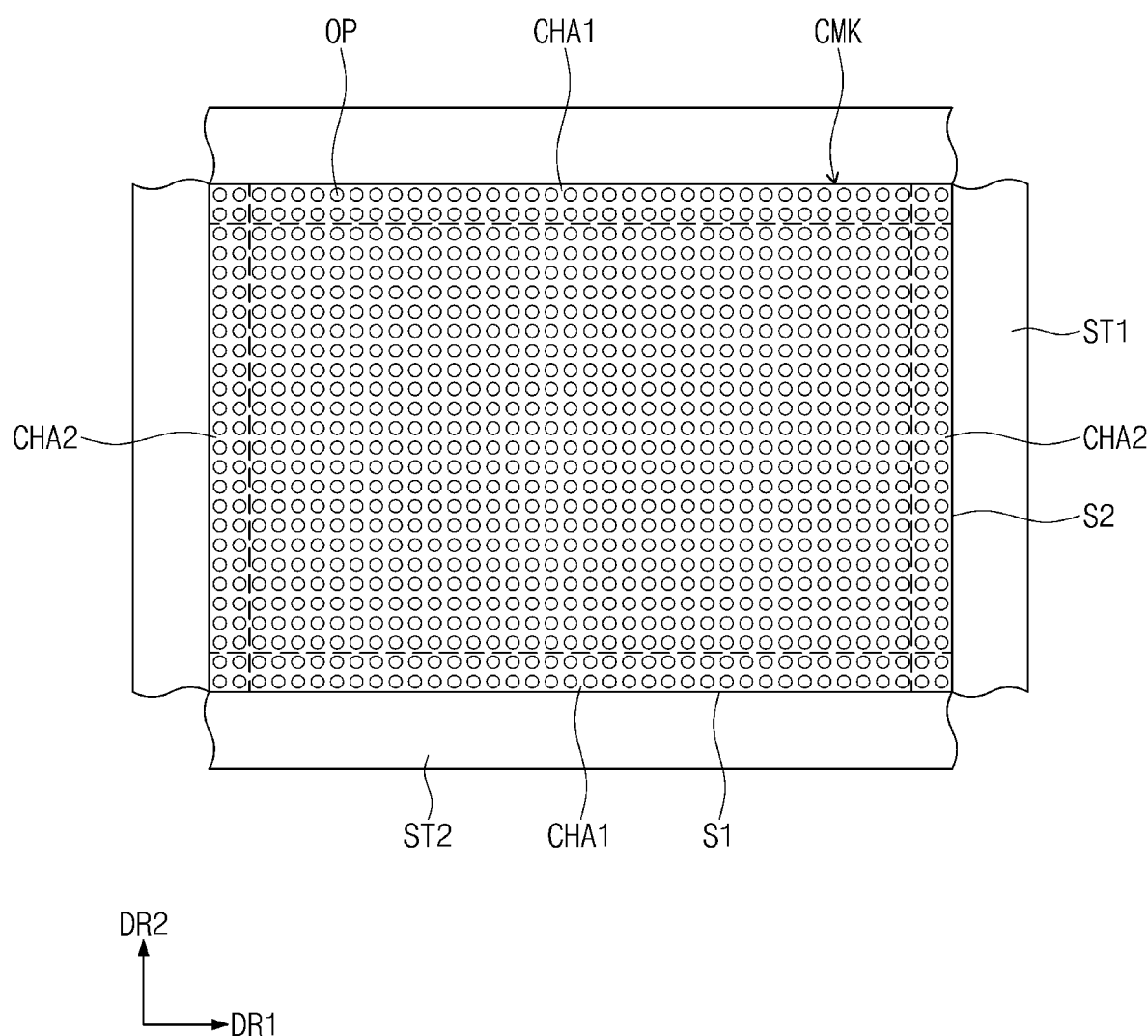
FIGS. 5A, 5B, and 5C are plan views schematically illustrating a cell mask shown in FIG. 4.
Figure 5B:
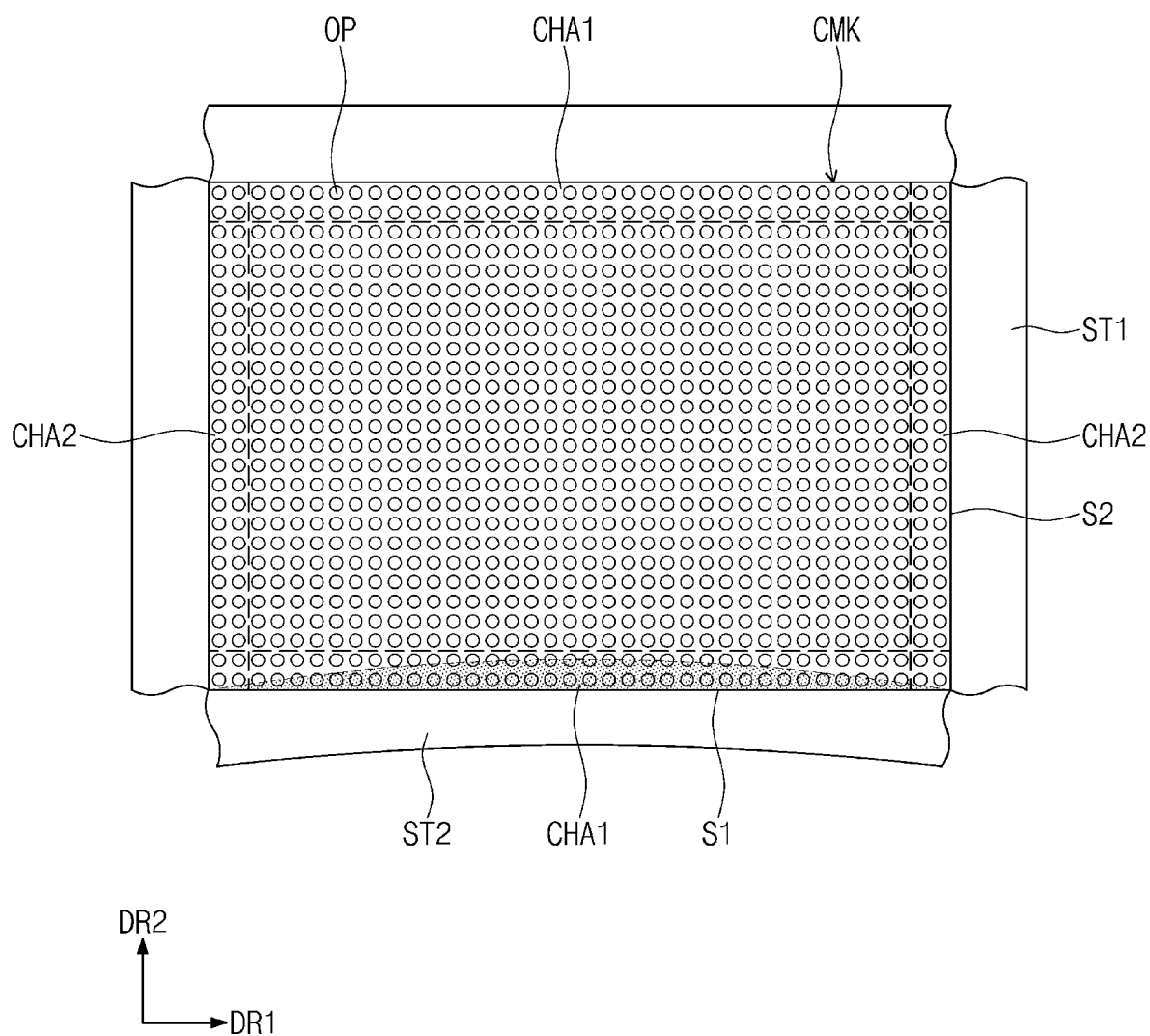
Figure 5C:
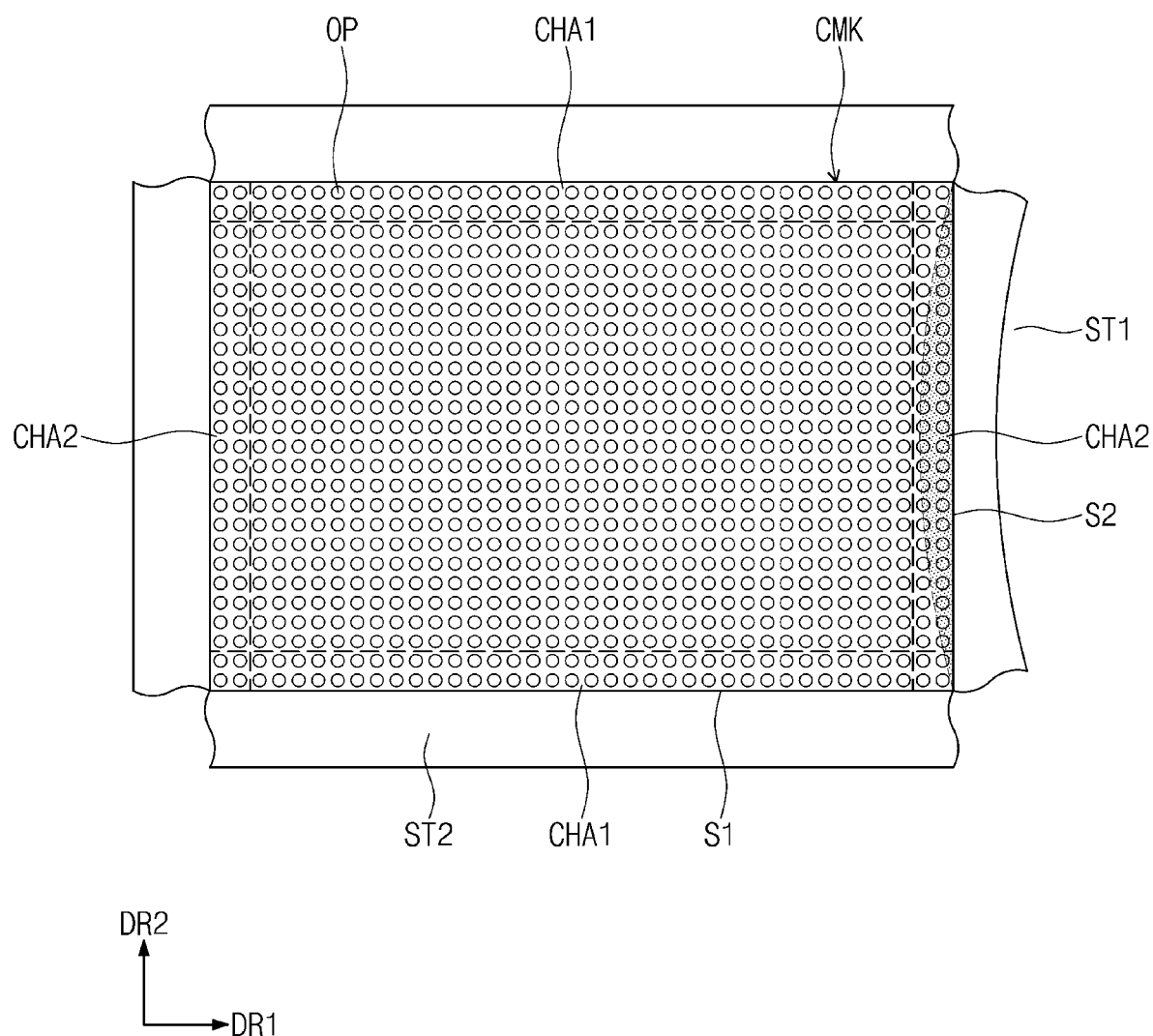

FIGS. 5A, 5B, and 5C are plan views schematically illustrating a cell mask CMK shown in FIG. 4. As an example, FIG. 5A is a plan view showing a normal cell mask. FIGS. 5B and 5C are plan views showing defective cell masks. For the convenience of explanation, FIGS. 5A, 5B, and 5C show a cell mask and first sticks ST1 and second sticks ST2 around the mask.

Referring to FIGS. 5A, 5B, and 5C, the openings OP may be arranged in a matrix form, however, the arrangement of the openings OP is not limited thereto or thereby.

The cell mask CMK may include first inspection areas CHA1 and second inspection areas CHA2, which are defined therein. The first inspection areas CHA1 and the second inspection areas CHA2 may be defined by the controller CC (refer to FIG. 1). For example, the camera CM (refer to FIG. 1) may take a photograph of the masks FMM, and the controller CC may set the first inspection areas CHA1 and the second inspection areas CHA2 in an image of the cell masks CMK of the masks FMM provided from the camera CM.

Referring to a cell mask CMK, the first inspection areas CHA1 may be defined as areas of the cell mask CMK adjacent to the second sticks ST2. The first inspection areas CHA1 may extend in the first direction DR1 and may be disposed at opposite ends of the cell mask CMK in the second direction DR2. The second inspection area CHA2 may be defined as areas of the cell mask CMK adjacent to the first sticks ST1. The second inspection areas CHA2 may extend in the second direction DR2 and may be disposed at opposite ends of the cell mask CMK in the first direction DR1.

The first inspection areas CHA1 may be set as an area including two openings OP arranged in two rows from the second sticks ST2, and the second inspection areas CHA2 may be set as an area including two openings OP arranged in two columns from the first sticks ST1, however, they are not limited thereto or thereby. For example, the first inspection areas CHA1 and the second inspection areas CHA2 may be set to include a larger number than the number of the above-mentioned openings OP. However, according to the embodiment of the disclosure, as the first inspection areas CHA1 and the second inspection areas CHA2 are set to include relatively fewer number of the openings OP, the inspection may be rapidly performed, and an efficiency of the inspection may be improved.

The first sticks ST1 and the second sticks ST2 may be bent by heat and by defects in the manufacturing process. The first sticks ST1 and the second sticks ST2 may be bent in case that the first sticks ST1 and the second sticks ST2 having a thin thickness are tensioned.

Referring to FIG. 5B, a second stick ST2 bent toward the first inspection area CHA1 is shown as an example. The second stick ST2 extending in the first direction DR1 and bent in the second direction DR2 may be disposed under the cell mask CMK and may overlap the first inspection area CHA1.

The second stick ST2 that is bent may overlap some of the openings OP of the first inspection area CHA1. Some of the openings OP of the first inspection area CHA1 may be partially or fully covered or overlapped by the second stick ST2 that is bent.

Referring to FIG. 5C, a first stick ST1 bent toward the second inspection area CHA2 is shown as an example. The first stick ST1 extending in the second direction DR2 and bent in the first direction DR1 may be disposed under the cell mask CMK and may overlap the second inspection area CHA2.

The first stick ST1 that is bent may overlap some of the openings OP of the second inspection area CHA2. Some of the openings OP of the second inspection area CHA2 may be partially or fully covered or overlapped by the first stick ST1 that is bent.

Figure 6:
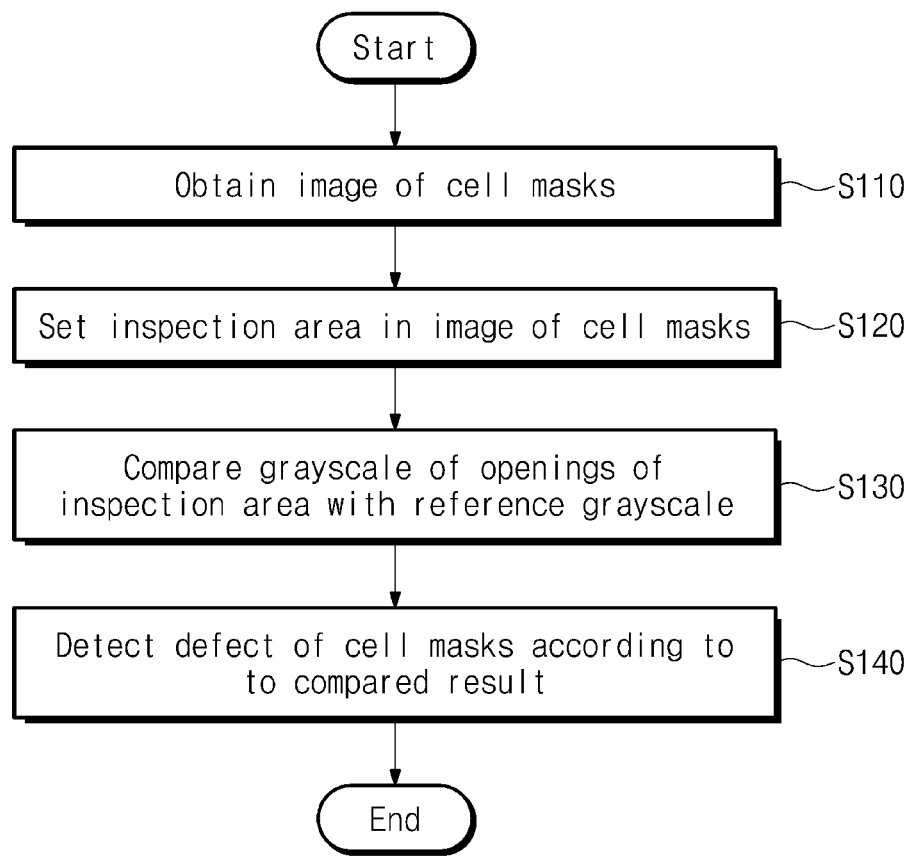
FIG. 6 is a flowchart schematically illustrating a mask inspection method according to an embodiment of the disclosure.

FIG. 6 is a flowchart showing a mask inspection method according to an embodiment of the disclosure.

Hereinafter, the mask inspection apparatus shown in FIG. 1 will be described together as needed for explanation.

Referring to FIGS. 1 and 6, the image of the cell masks CMK may be obtained (step S110). For example, the camera CM of the mask inspection apparatus MIA may take a photograph of the masks FMM. Accordingly, the image of the cell masks CMK of the masks FMM may be obtained by the camera CM.

The inspection area may be set in the image of the cell masks CMK (step S120). For example, as shown in FIGS. 5A to 5C, the first and second inspection areas CHA1 and CHA2 adjacent to the first and second sides S1 and S2 of each of the cell masks CMK may be set as the inspection area. The controller CC may set the first and second inspection areas CHA1 and CHA2 adjacent to the first and second sides S1 and S2 of each of the cell masks CMK as the inspection area in the image of the cell masks CMK.

Since the light source LS provides a light to the cell masks CMK, the light may be provided to the camera CM after passing through the openings OP of the cell masks CMK. Accordingly, the image of the openings OP taken by the camera CM may have a predetermined grayscale due to the light. In the image, the grayscale of the openings OP may be determined based on the light.

The grayscale of the openings OP of the inspection area may be compared with a reference grayscale (step S130). For example, the controller CC may compare the grayscale of the openings OP of the inspection area in the image taken by the camera CM with the reference grayscale. Although not shown in figures, the controller CC may further include a memory in which data related to the reference grayscale is stored.

The grayscales of the openings OP defined in the first inspection areas CHA1 and the second inspection areas CHA2 of the cell masks CMK may be compared with the reference grayscale. The grayscales of the openings OP of the first inspection areas CHA1 and the grayscales of the openings OP of the second inspection areas CHA2 may be sequentially compared with the reference grayscale.

According to the compared result, defects of the cell masks CMK may be detected (step S140). For example, the controller CC may compare the grayscale of the openings OP of the inspection area in the image taken by the camera CM with the reference grayscale, and may detect the defect of the cell masks CMK.

In case that the grayscales of the openings OP of the first and second inspection areas CHA1 and CHA2 are smaller than the reference grayscale, the cell masks CMK may be determined as defective masks. In case that the grayscales of the openings OP of the first and second inspection areas CHA1 and CHA2 are equal to or greater than the reference grayscale, the cell masks CMK may be determined as normal mask.

It is possible to inspect whether or not the first sticks ST1 and the second sticks ST2 are bent and cover or overlap the openings OP of the masks FMM using the mask inspection apparatus MIA before the deposition process. Accordingly, a defect rate in the deposition process may be reduced.

Figure 7A:
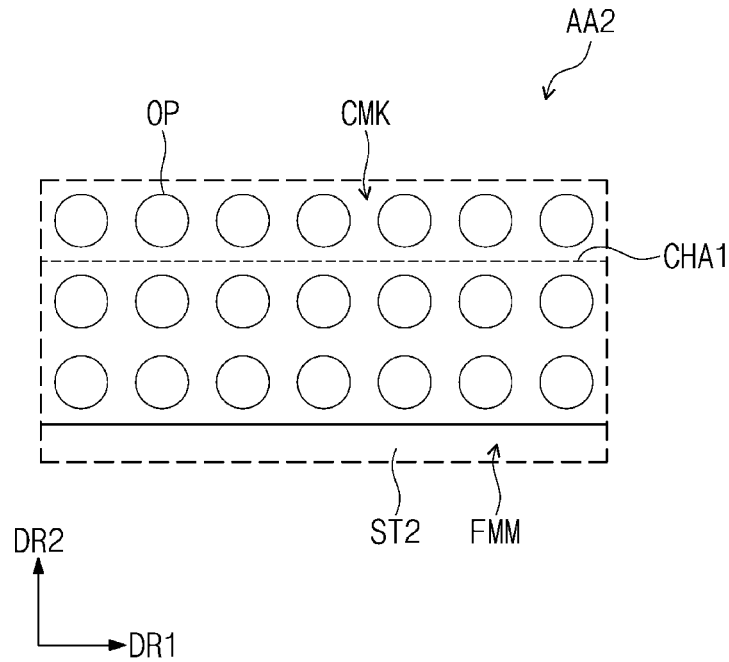
FIGS. 7A and 7B are plan views schematically illustrating a method of detecting a defect of a mask in an area AA2 shown in FIG. 4.
Figure 7B:
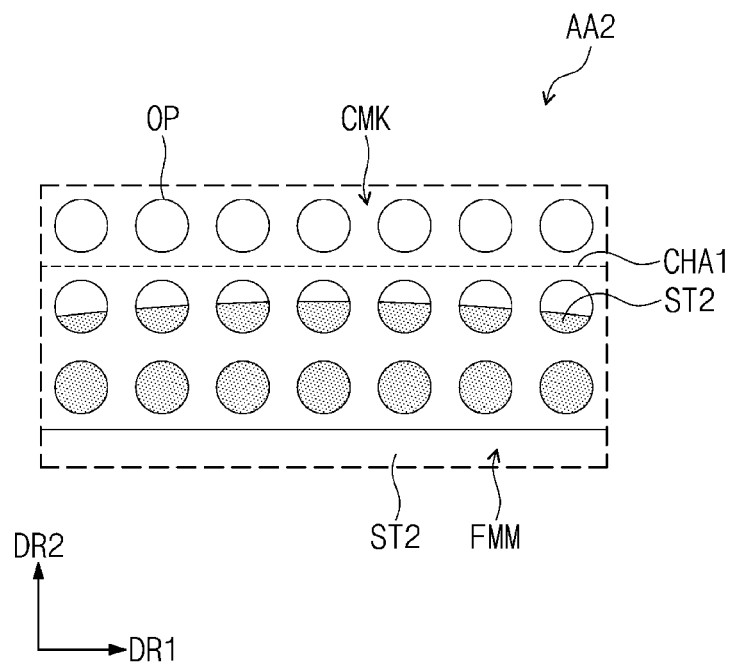

FIGS. 7A and 7B are plan views schematically illustrating a method of detecting the defect of the mask in an area AA2 shown in FIG. 4. For the convenience of explanation, the second stick ST2 is shown as an example.

Hereinafter, the mask inspection method shown in FIG. 6 will be described together.

Referring to FIGS. 6 and 7A, the controller CC (refer to FIG. 1) may check the grayscales of the openings OP of the first inspection area CHA1 and may compare the grayscales of the openings OP of the first inspection area CHA1 with the reference grayscale to determine whether the cell mask CMK is normal or defective.

The reference grayscale may be set to a grayscale in a range of about 20 to about 80 grayscales. However, the reference grayscale is not limited thereto or thereby. Hereinafter, the inspection method of the mask having the reference grayscale set to about 30 grayscale will be described.

The light source LS may provide the light to the openings OP of the first inspection area CHA1. Since the light passes through the openings OP, images of the openings OP through which the light passes may have high grayscales. The openings OP of the first inspection area CHA1 are not covered or overlapped by the second stick ST2, and the images of the openings OP of the first inspection area CHA1 may have the grayscales equal to or greater than about 30 grayscale. The controller CC may compare the grayscales equal to or greater than about 30 grayscale with the reference grayscale, and may determine the cell mask CMK as the normal cell mask CMK.

Referring to FIG. 7B, the openings OP of the first inspection area CHA1 may overlap the second stick ST2. In case that the openings OP of the first inspection area CHA1 are covered or overlapped by the second stick ST2, the light provided from the light source LS may be blocked by the second stick ST2. Accordingly, the images of the openings OP in which the light is blocked may have low grayscales. The images of the openings OP of the first inspection area CHA1 covered or overlapped by the second stick ST2 may have the grayscales less than about 30. The controller CC may compare the grayscales less than about 30 with the reference grayscale, and may determine the cell mask CMK as the defective cell mask CMK.

Figure 8A:
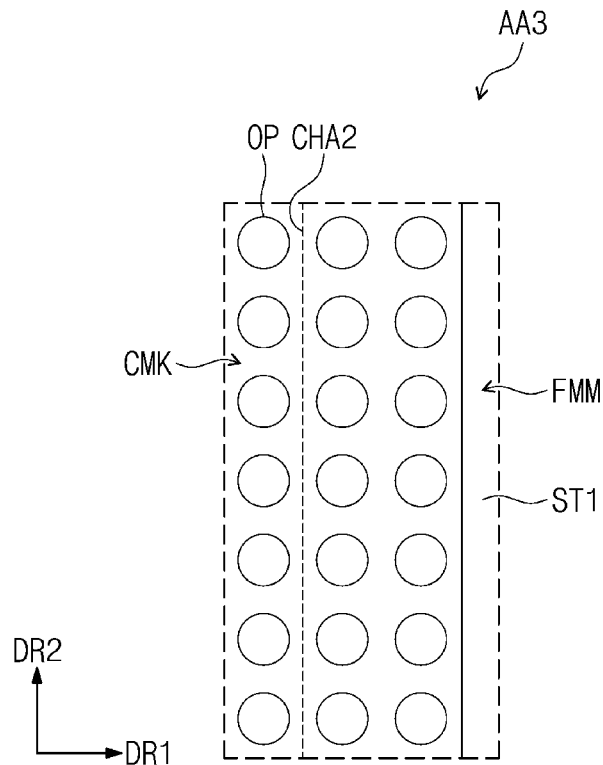
FIGS. 8A and 8B are plan views schematically illustrating a method of detecting a defect of a mask in an area AA3 shown in FIG. 4.
Figure 8B:
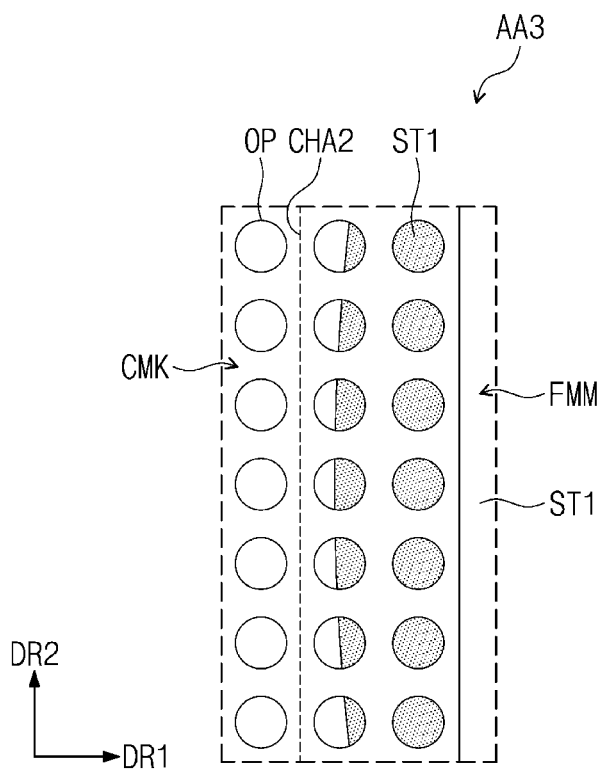

FIGS. 8A and 8B are plan views schematically illustrating a method of detecting the defect of the mask in an area AA3 shown in FIG. 4. For the convenience of explanation, the first stick ST1 is shown as an example.

Hereinafter, the mask inspection method shown in FIG. 6 will be described together.

Referring to FIGS. 6 and 8A, the light source LS may provide the light to the openings OP of the second inspection area CHA2. Images of the openings OP of the second inspection area CHA2 are not covered or overlapped by the first stick ST1, and the images of the openings OP of the second inspection area CHA2 may have grayscales equal to or greater than about 30. The controller CC may compare the grayscales equal to or greater than about 30 with the reference grayscale, and may determine the cell mask CMK as the normal cell mask CMK.

Referring to FIG. 8B, the openings OP of the second inspection area CHA2 may overlap the first stick ST1. In case that the openings OP of the second inspection area CHA2 are covered or overlapped by the first stick ST1, the light provided from the light source LS may be blocked by the first stick ST1. The images of the openings OP of the second inspection area CHA2 covered or overlapped by the first stick ST1 may have the grayscales less than about 30. The controller CC may compare the grayscales less than about 30 with the reference grayscale, and may determine the cell mask CMK as the defective cell mask CMK.

Figure 9:
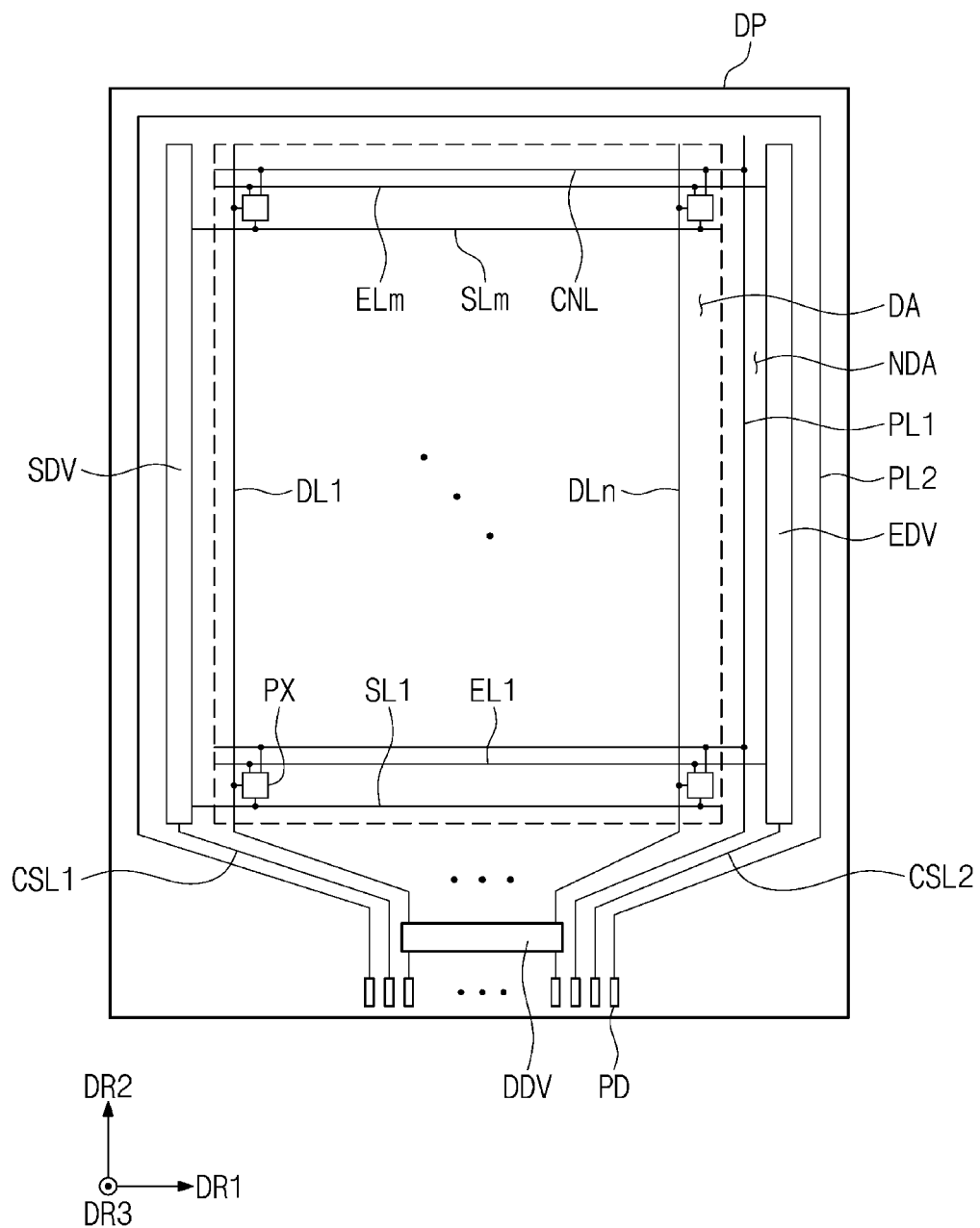
FIG. 9 is a plan view schematically illustrating a display panel manufactured using the masks shown in FIG. 1.

FIG. 9 is a plan view schematically illustrating a display panel manufactured using the masks shown in FIG. 1.

Referring to FIG. 9, the display panel DP may have a rectangular shape defined by long sides extending in the second direction DR2 and short sides extending in the first direction DR1, however, the shape of the display panel DP is not limited to the rectangular shape. The display panel DP may include a display part DA and a non-display part NDA surrounding the display part DA.

The display panel DP may be a light-emitting type display panel. For instance, the display panel DP may be an organic light emitting display panel or a quantum dot light emitting display panel. A light emitting layer of the organic light emitting display panel may include an organic light emitting material. A light emitting layer of the quantum dot light emitting display panel may include a quantum dot or a quantum rod. Hereinafter, the organic light emitting display panel will be described as an example of the display panel DP.

The display panel DP may include pixels PX, scan lines SL1 to SLm, data lines DL1 to DLn, emission lines EL1 to ELm, first and second control lines CSL1 and CSL2, first and second power lines PL1 and PL2, connection lines CNL, and pads PD. Each of "m" and "n" is a natural number.

The pixels PX may be arranged in the display part DA. A scan driver SDV and an emission driver EDV may be disposed in the non-display part NDA to be respectively adjacent to the long sides of the display panel DP. A data driver DDV may be disposed in the non-display part NDA to be adjacent to a short side of the short sides of the display panel DP. In a plan view, the data driver DDV may be disposed to be adjacent to a lower end of the display panel DP.

The scan lines SL1 to SLm may extend in the first direction DR1 and may be electrically connected to the pixels PX and the scan driver SDV. The data lines DL1 to DLn may extend in the second direction DR2 and may be electrically connected to the pixels PX and the data driver DDV. The emission lines EL1 to ELm may extend in the first direction DR1 and may be electrically connected to the pixels PX and the emission driver EDV.

The first power line PL1 may extend in the second direction DR2 and may be disposed in the non-display part NDA. The first power line PL1 may be disposed between the display part DA and the emission driver EDV, however, it is not limited thereto or thereby. For example, the first power line PL1 may be disposed between the display part DA and the scan driver SDV.

The connection lines CNL may extend in the first direction DR1 and may be arranged in the second direction DR2. The connection lines CNL may be electrically connected to the first power line PL1 and the pixels PX. A first voltage may be applied to the pixels PX through the first power line PL1 and the connection lines CNL electrically connected to the first power line PL1.

The second power line PL2 may be disposed in the non-display part NDA. The second power line PL2 may extend along the long sides of the display panel DP, and a short side at which the data driver DDV is not disposed in the display panel DP. The second power line PL2 may be disposed outside the scan driver SDV and the emission driver EDV.

Although not shown in figures, the second power line PL2 may extend to the display part DA and may be electrically connected to the pixels PX. A second voltage having a level lower than that of the first voltage may be applied to the pixels PX through the second power line PL2.

The first control line CSL1 may be electrically connected to the scan driver SDV and may extend toward the lower end of the display panel DP in a plan view. The second control line CSL2 may be electrically connected to the emission driver EDV and may extend toward the lower end of the display panel DP in a plan view. The data driver DDV may be disposed between the first control line CSL1 and the second control line CSL2.

The pads PD may be disposed on the display panel DP. The pads PD may be disposed closer to the lower end of the display panel DP than the data driver DDV is. The data driver DDV, the first power line PL1, the second power line PL2, the first control line CSL1, and the second control line CSL2 may be electrically connected to the pads PD. The data lines DL1 to DLn may be electrically connected to the data driver DDV, and the data driver DDV may be electrically connected to the pads PD corresponding to the data lines DL1 to DLn.

Light emitting elements (or light emitting diodes) of display panels DP may be formed using the cell masks CMK.

Although not shown in figures, a timing controller to control an operation of the scan driver SDV, the data driver DDV, and the emission driver EDV and a voltage generator to generate the first and second voltages may be disposed on a printed circuit board. The timing controller and the voltage generator may be electrically connected to corresponding pads PD via the printed circuit board.

The scan driver SDV may generate scan signals, and the scan signals may be applied to the pixels PX via the scan lines SL1 to SLm. The data driver DDV may generate data voltages, and the data voltages may be applied to the pixels PX via the data lines DL1 to DLn. The emission driver EDV may generate emission signals, and the emission signals may be applied to the pixels PX via the emission lines EL1 to ELm.

The pixels PX may receive the data voltages in response to the scan signals. The pixels PX may emit a light having a luminance corresponding to the data voltages in response to the emission signals, and the image may be displayed. An emission time of the pixels PX may be controlled by the emission signals.

Figure 10:
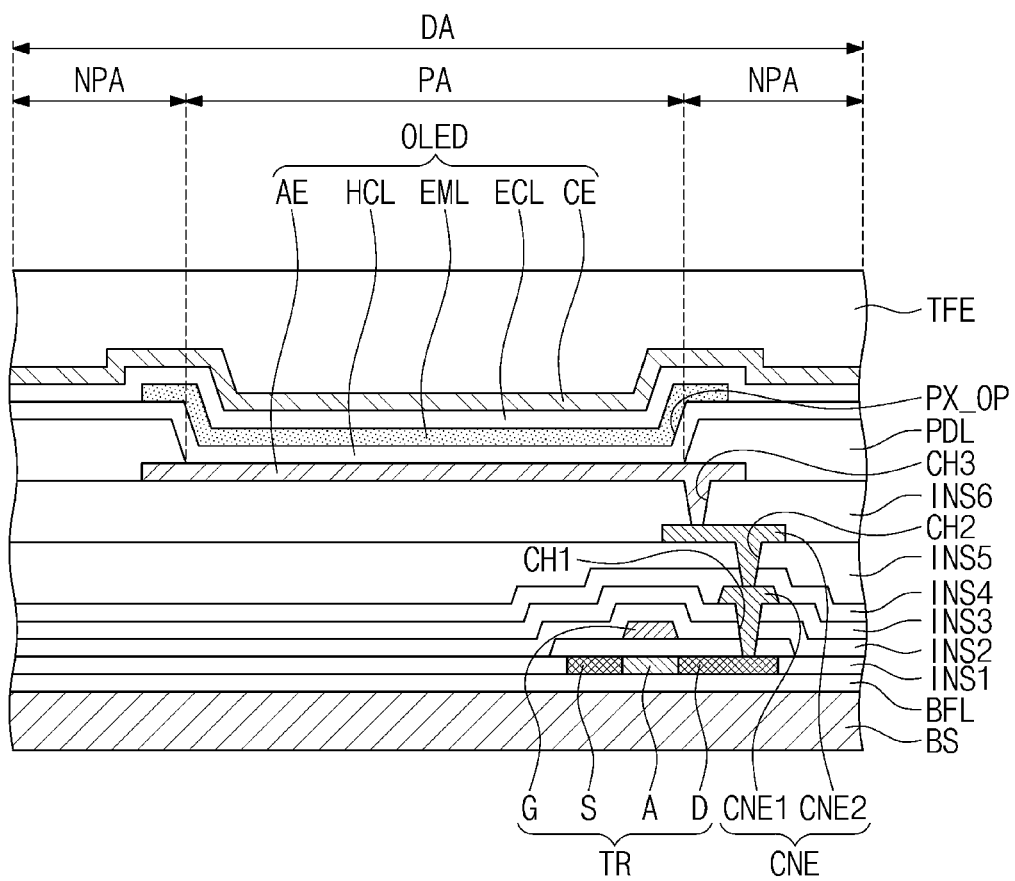
FIG. 10 is a cross-sectional view schematically illustrating a pixel shown in FIG. 9.

FIG. 10 is a cross-sectional view schematically illustrate a pixel shown in FIG. 9.

Referring to FIG. 10, the pixel PX may be disposed on a base substrate BS and may include a transistor TR and a light emitting element (or light emitting diode) OLED. The light emitting element OLED may include a first electrode AE, a second electrode CE, a hole control layer HCL, an electron control layer ECL, and a light emitting layer EML. The first electrode AE may be an anode electrode, and the second electrode CE may be a cathode electrode.

The transistor TR and the light emitting element OLED may be disposed on the base substrate BS. As an example, a transistor TR is shown in FIG. 10, however, the pixel PX may include transistors and at least one capacitor to drive the light emitting element OLED.

The display part DA may include a light emitting part PA corresponding to each pixel PX and a non-light-emitting part NPA adjacent to or around the light emitting part PA. The light emitting element OLED may be disposed in the light emitting part PA.

The base substrate BS may include a flexible plastic material. As an example, the base substrate BS may include transparent polyimide (PI). A buffer layer BFL may be disposed on the base substrate BS, and the buffer layer BFL may be an inorganic layer.

A semiconductor pattern may be disposed on the buffer layer BFL. The semiconductor pattern may include a polycrystalline silicon, however, it is not limited thereto or thereby. The semiconductor pattern may include amorphous silicon or metal oxide.

The semiconductor pattern may be doped with an N-type dopant or a P-type dopant. The semiconductor pattern may include a high-doped region and a low-doped region. The high-doped region may have a conductivity greater than that of the low-doped region and may substantially functions as a source electrode and a drain electrode of the transistor TR. The low-doped region may substantially correspond to an active (or a channel) of the transistor TR.

A source S, an active A, and a drain D of the transistor TR may be formed from the semiconductor pattern. A first insulating layer INS1 may be disposed on the semiconductor pattern. A gate G of the transistor TR may be disposed on the first insulating layer INS1. A second insulating layer INS2 may be disposed on the gate G. A third insulating layer INS3 may be disposed on the second insulating layer INS2.

A connection electrode CNE may be disposed between the transistor TR and the light emitting element OLED to electrically connect the transistor TR to the light emitting element OLED. The connection electrode CNE may include a first connection electrode CNE1 and a second connection electrode CNE2.

The first connection electrode CNE1 may be disposed on the third insulating layer INS3 and may be electrically connected to the drain D via a first contact hole CH1 defined through the first, second, and third insulating layers INS1, INS2, and INS3. A fourth insulating layer INS4 may be disposed on the first connection electrode CNE1. A fifth insulating layer INS5 may be disposed on the fourth insulating layer INS4.

The second connection electrode CNE2 may be disposed on the fifth insulating layer INS5 and may be electrically connected to the first connection electrode CNE1 via a second contact hole CH2 defined through the fifth insulating layer INS5. A sixth insulating layer INS6 may be disposed on the second connection electrode CNE2. Each of the first to sixth insulating layers INS1 to INS6 may be an inorganic layer or an organic layer.

The first electrode AE may be disposed on the sixth insulating layer INS6. The first electrode AE may be electrically connected to the second connection electrode CNE2 via a third contact hole CH3 defined through the sixth insulating layer INS6. A pixel definition layer PDL may be disposed on the first electrode AE and the sixth insulating layer INS6 to expose a predetermined portion of the first electrode AE. The pixel definition layer PDL may be provided with an opening PX_OP defined therethrough to expose the portion of the first electrode AE.

The hole control layer HCL may be disposed on the first electrode AE and the pixel definition layer PDL. The hole control layer HCL may be commonly disposed in the light emitting part PA and the non-light-emitting part NPA. The hole control layer HCL may include a hole transport layer and a hole injection layer.

The light emitting layer EML may be disposed on the hole control layer HCL. The light emitting layer EML may be disposed in an area corresponding to the opening PX_OP. The light emitting layer EML may include an organic material and/or an inorganic material. The light emitting layer EML may generate a light having one of red, green, and blue colors.

The electron control layer ECL may be disposed on the light emitting layer EML and the hole control layer HCL. The electron control layer ECL may be commonly disposed in the light emitting part PA and the non-light-emitting part NPA. The electron control layer ECL may include an electron transport layer and an electron injection layer.

The second electrode CE may be disposed on the electron control layer ECL. The second electrode CE may be commonly disposed in the pixels PX. Layers from the buffer layer BFL to the light emitting element OLED may be referred to as a pixel layer PXL.

A thin film encapsulation layer TFE may be disposed on the light emitting element OLED. The thin film encapsulation layer TFE may be disposed on the second electrode CE to cover or overlap the pixel PX. The thin film encapsulation layer TFE may include at least two inorganic layers and organic layers disposed between the inorganic layers. The inorganic layer may protect the pixel PX from moisture and oxygen. The organic layer may protect the pixel PX from a foreign substance such as dust particles.

The first voltage may be applied to the first electrode AE via the transistor TR, and the second voltage, which has a voltage level lower than that of the first voltage, may be applied to the second electrode CE. Holes and electrons injected into the light emitting layer EML may be recombined to generate excitons, and the light emitting element OLED may emit light by the excitons that return to a ground state from an excited state.

Figure 11:
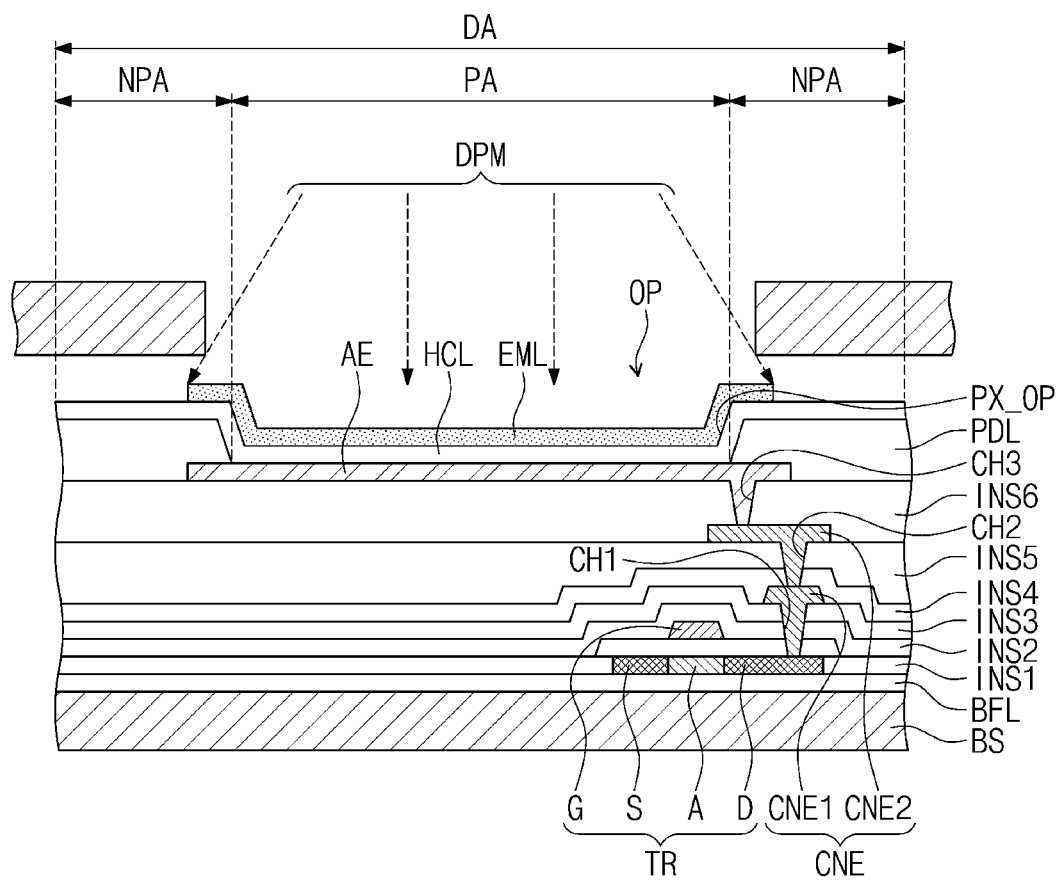
FIG. 11 is a cross-sectional view schematically illustrating a deposition process using masks shown in FIG. 1.

FIG. 11 is a cross-sectional view schematically illustrating a deposition process using masks shown in FIG. 1.

As an example, FIG. 11 shows an opening OP of the cell mask CMK.

Referring to FIG. 11, the cell mask CMK may be disposed on the base substrate BS. The hole control layer HCL may be disposed on the first electrode AE, and the cell mask CMK may be used to form the light emitting layer EML on the hole control layer HCL.

A deposition material DPM may be provided on the hole control layer HCL via the opening OP defined through the cell mask CMK. The light emitting layer EML may be formed by the deposition material DPM.

Although the embodiments of the disclosure have been described, it is understood that the disclosure is not limited to these embodiments but various changes and modifications can be made by one of ordinary skill in the art within the spirit and scope of the disclosure. Therefore, the disclosed subject matter is not limited to any single embodiment described herein.

What is claimed is:

1. A mask inspection method comprising:
   photographing a cell mask through which a plurality of openings is formed to obtain an image;
   setting an area of the image adjacent to an edge of the cell mask as an inspection area adjacent to at least one of a plurality of first sticks or a plurality of second sticks;
   comparing a grayscale of the plurality of openings in the inspection area with a reference grayscale; and
   checking a defect of the cell mask according to a result of the comparing of the grayscale of the plurality of openings.

2. The mask inspection method of claim 1, wherein the reference grayscale is set to a value in a range of about 20 to about 80.

3. The mask inspection method of claim 1, wherein the checking of the defect of the cell mask comprises determining that the cell mask is a defective cell mask in case that the grayscale of the plurality of openings is less than the reference grayscale.

4. The mask inspection method of claim 1, wherein the checking of the defect of the cell mask comprises determining that the cell mask is a normal cell mask in case that the grayscale of the plurality of openings is equal to or greater than the reference grayscale.

5. The mask inspection method of claim 1, wherein the cell mask comprises:
   first sides extending in a first direction and disposed at ends of the cell mask in a second direction intersecting the first direction; and
   second sides extending in the second direction and disposed at ends of the cell mask in the first direction,
   the plurality of first sticks are disposed under the second sides and extend in the second direction, and
   the plurality of second sticks are disposed under the first sides and extend in the first direction.

6. The mask inspection method of claim 5, wherein the setting of the inspection area comprises:
   setting areas of the cell mask adjacent to the first sides in the image as a first inspection area; and
   setting areas of the cell mask adjacent to the second sides in the image as a second inspection area.

7. The mask inspection method of claim 6, wherein the grayscale of the plurality of openings of the second inspection area is less than the reference grayscale in case that the plurality of openings of the second inspection area overlap the first sticks.

8. The mask inspection method of claim 6, wherein the grayscale of the plurality of openings of the second inspection area is equal to or greater than the reference grayscale in case that the plurality of openings of the second inspection area do not overlap the first sticks.

9. The mask inspection method of claim 6, wherein the grayscale of the plurality of openings of the first inspection area is less than the reference grayscale in case that the plurality of openings of the first inspection area overlap the second sticks.

10. The mask inspection method of claim 6, wherein the grayscale of the plurality of openings of the first inspection area is equal to or greater than the reference grayscale in case that the plurality of openings of the first inspection area do not overlap the second sticks.

11. The mask inspection method of claim 1, further comprising irradiating light to the cell mask from under the cell mask, wherein
the setting the area of the image adjacent to the edge of the cell mask as an inspection area involves setting a number of rows or a number of columns of the openings adjacent to the edge as the inspection area.

12. The mask inspection method of claim 11, wherein the grayscale of the plurality of openings in the image is determined based on the light.

13. The mask inspection method of claim 1, wherein the inspection area is an area of the image adjacent to a periphery of the cell mask.

14. The mask inspection method of claim 1, wherein
the plurality of first sticks and the plurality of second sticks are disposed under the cell mask about peripheral edges of the cell mask, and
the inspection area corresponds to a number of rows or a number of columns of the plurality of openings adjacent to at least one of the plurality of first sticks and the plurality of second sticks.

15. The mask inspection method of claim 1, wherein the inspection area is confined only to edge portions of the cell mask.

16. A mask inspection apparatus comprising:
a camera photographing a cell mask through which a plurality of openings is formed to obtain an image;
a light source disposed under the cell mask to provide light to the cell mask;
a plurality of first sticks and a plurality of second sticks disposed between the cell mask and the light source; and
a controller checking a defect of the cell mask using the image,
wherein the controller sets an area of the image adjacent to an edge of the cell mask as an inspection area adjacent to at least one of the plurality of first sticks or the plurality of second sticks, compares a grayscale of the plurality of openings in the inspection area with a reference grayscale, and checks a defect of the cell mask according to a result of the comparing of the grayscale of the plurality of openings.

17. The mask inspection apparatus of claim 16, wherein the controller determines that the cell mask is a defective cell mask in case that the grayscale of the plurality of openings is less than the reference grayscale and determines that the cell mask is a normal cell mask in case that the grayscale of the plurality of openings is equal to or greater than the reference gray scale.

18. The mask inspection apparatus of claim 16, wherein the cell mask comprises:
first sides extending in a first direction and disposed at ends of the cell mask in a second direction intersecting the first direction; and
second sides extending in the second direction and disposed at ends of the cell mask in the first direction,
the plurality of first sticks are disposed under the second sides and extend in the second direction, and
the plurality of second sticks are disposed under the first sides and extend in the first direction.

19. The mask inspection apparatus of claim 18, wherein the inspection area comprises:
a first inspection area set as areas of the cell mask adjacent to the first sides in the image; and
a second inspection area set as areas of the cell mask adjacent to the second sides in the image.

20. The mask inspection apparatus of claim 19, wherein
the grayscale of the plurality of openings of the second inspection area is less than the reference grayscale in case that the plurality of openings of the second inspection area overlap the first sticks, and
the grayscale of the plurality of openings of the second inspection area is equal to or greater than the reference grayscale in case that the plurality of openings of the second inspection area do not overlap the first sticks.

21. The mask inspection apparatus of claim 19, wherein
the grayscale of the plurality of openings of the first inspection area is less than the reference grayscale in case that the plurality of openings of the first inspection area overlap the second sticks, and
the grayscale of the plurality of openings of the first inspection area is equal to or greater than the reference grayscale in case that the plurality of openings of the first inspection area do not overlap the second sticks.

22. The mask inspection apparatus of claim 18, wherein the controller includes a memory in which data related to the reference grayscale is stored.

23. The mask inspection method of claim 16, wherein the reference grayscale is set to a value in a range of about 20 to about 80.

* * * * *